H. KELLY.
FRUIT-DRIER.

No. 179,857.  Patented July 18, 1876.

WITNESSES  
Horace Brown Nicholas  
John Cattrin

INVENTOR  
Hampton Kelly

UNITED STATES PATENT OFFICE.

HAMPTON KELLY, OF MULTNOMAH COUNTY, OREGON.

IMPROVEMENT IN FRUIT-DRIERS.

Specification forming part of Letters Patent No. 179,857, dated July 18, 1876; application filed February 29, 1876.

*To all whom it may concern:*

Be it known that I, HAMPTON KELLY, of Multnomah county, State of Oregon, have invented a Machine for Drying or Condensing Fruits, Vegetables, or Fluids, of which the following is a specification:

The object of my invention is to dry or condense fruits, vegetables, or fluids, that they may be preserved in a good and palatable condition, and in a form peculiarly adapted to transportation for any desired length of time. This object is attained in the following manner: The fruits or vegetables, after being properly cleaned, are made into a pulp by a process of grinding or boiling, and this pulp, after being reduced to the proper consistency, is fed from a reservoir upon a revolving cylinder kept at a gentle heat until a layer of sufficient thickness is formed, when the feed is stopped, and the fruit or fluid, when sufficiently dried or condensed, is removed.

Figures 1, 2:
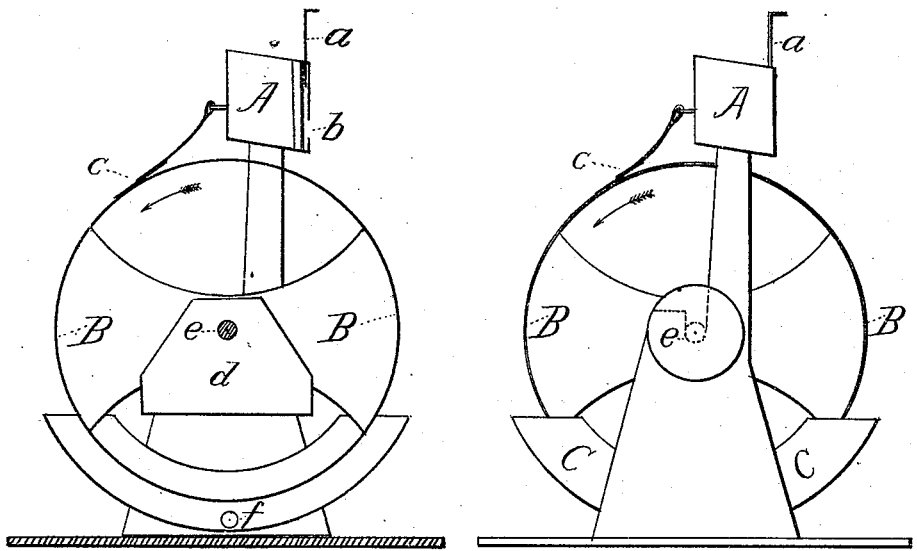
Figure 3:
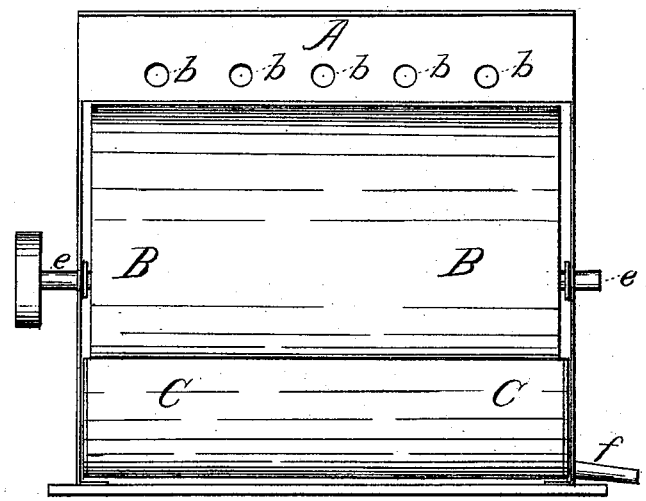

The machine by which this is accomplished is illustrated more in detail in the drawings of the end elevation, Figure 2, of the side elevation, Fig. 3, and of the vertical section, Fig. 1.

The pulp or fluid is held in the reservoir A. From this it flows, regulated by the gate $a$, through the openings $b\ b\ b\ b\ b$, upon the hollow metal cylinder B B, which is kept in constant revolution in the direction indicated by the arrows. Upon this cylinder the pulp is spread in a layer of uniform thickness by the distributer $c$, it (the cylinder) being meanwhile kept at a uniform temperature of from 50° to 200° by means of steam-pipes inserted in the interior thereof, and by heat applied upon the outside; or it may be heated, as represented in the sectional drawing, Fig. 1, by a charcoal-fire, placed in a fire-box, $d$, swinging upon the shaft $e\ e$ of the main cylinder. The drippings are caught in the trough C, and carried off by the waste-pipe $f$.

The fluids to be condensed by this device are meat extracts, milk, cider, and all other animal or vegetable juices or liquids capable of condensation.

I claim as my invention—

The combination, in a fruit-drying and fluid-condensing machine, of a revolving hollow cylinder with a reservoir, distributer, and heating apparatus, substantially as described.

HAMPTON KELLY.

Witnesses:
 HORACE BROWN NICHOLAS,
 JOHN CATLIN.